Oct. 20, 1936.    W. OWEN    2,057,844
MACHINE FOR EDGING GLASS SHEETS
Filed Jan. 11, 1936    4 Sheets-Sheet 2

INVENTOR
WILLIAM OWEN
BY Bradley & Lee
ATTORNEYS.

Oct. 20, 1936.  W. OWEN  2,057,844

MACHINE FOR EDGING GLASS SHEETS

Filed Jan. 11, 1936  4 Sheets-Sheet 3

INVENTOR
WILLIAM OWEN
BY Bradley & Bee
ATTORNEYS.

Oct. 20, 1936.  W. OWEN  2,057,844
MACHINE FOR EDGING GLASS SHEETS
Filed Jan. 11, 1936  4 Sheets-Sheet 4
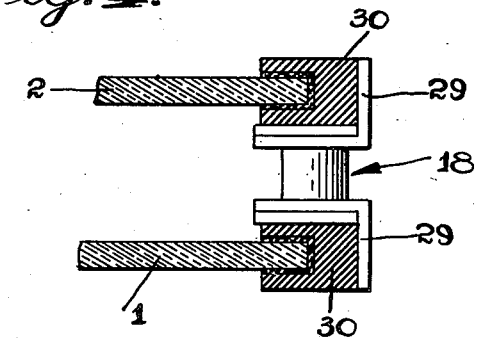
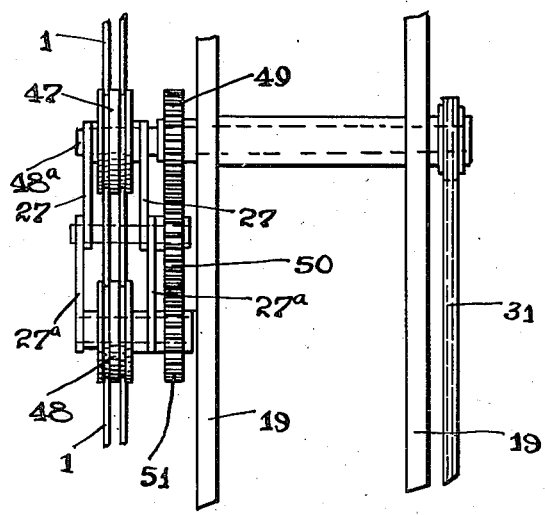
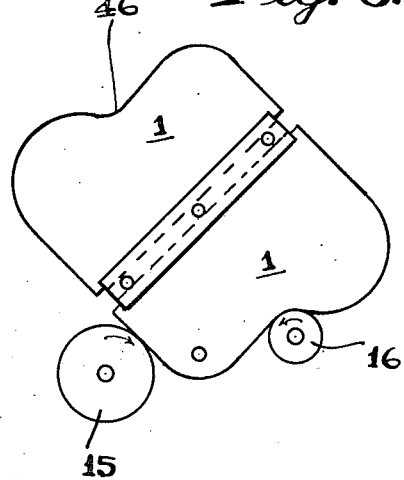
INVENTOR
WILLIAM OWEN
BY Bradley & Bee
ATTORNEYS.

Patented Oct. 20, 1936

2,057,844

UNITED STATES PATENT OFFICE 2,057,844

MACHINE FOR EDGING GLASS SHEETS

William Owen, Pittsburgh, Pa., assignor to Pittsburgh Plate Glass Company, a corporation of Pennsylvania Application January 11, 1936, Serial No. 58,718

7 Claims. (Cl. 51—103)

The invention relates to apparatus for grinding the edges of glass sheets ordinarily to give them the half round or pencil edge required for automobile glass, and the apparatus herein shown and described constitutes an improvement on the apparatus of my application for patent, Serial No. 24,383, filed May 31, 1935. The invention is illustrated as applied to plates or sheets of safety glass consisting of two sheets of glass cemented to an interposed sheet of celluloid or the like, but the machine is equally well adapted for grinding the edges of sheets of ordinary plate glass and for edging sheets designed for service other than as automobile glass.

Figure 1:
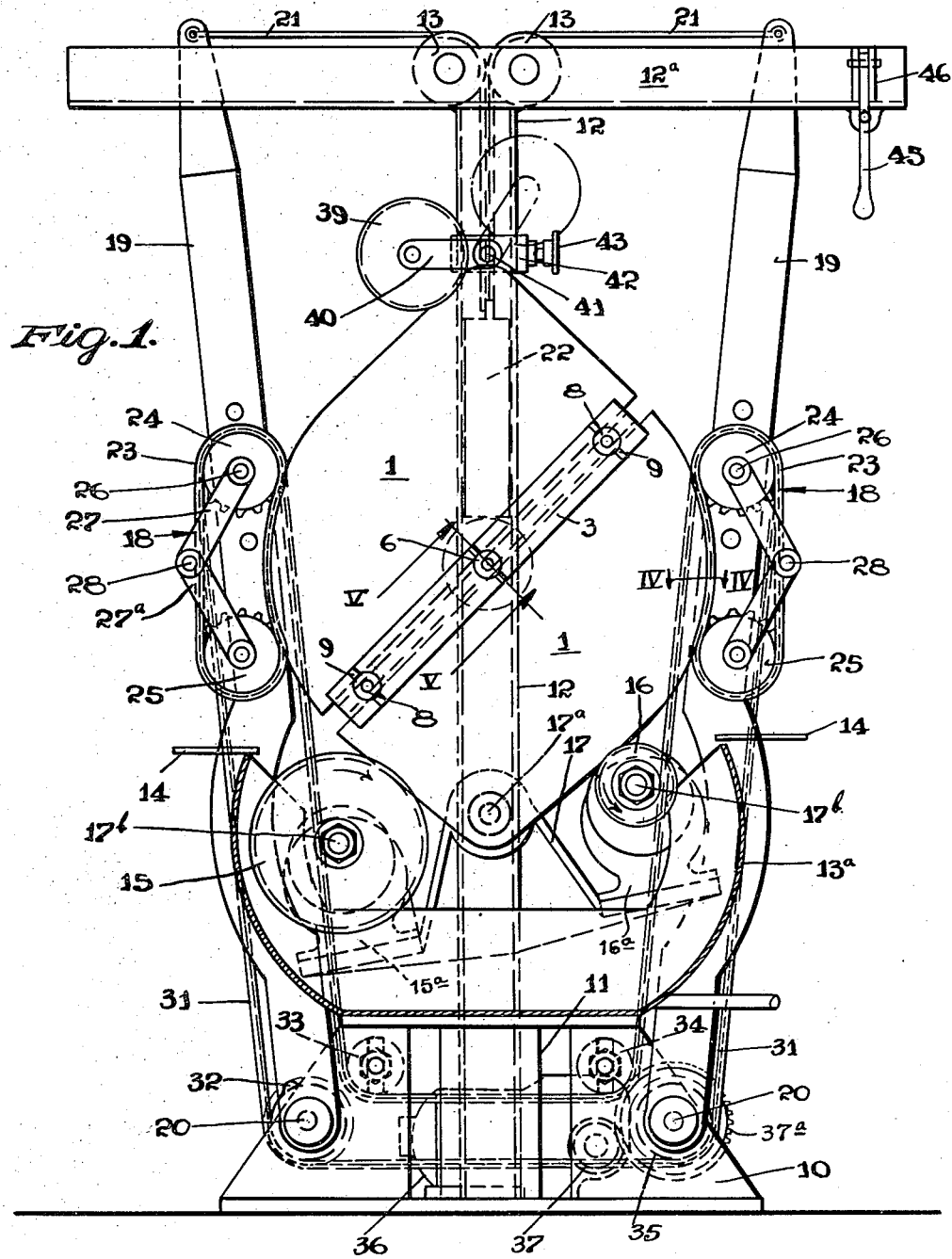
Figure 2:
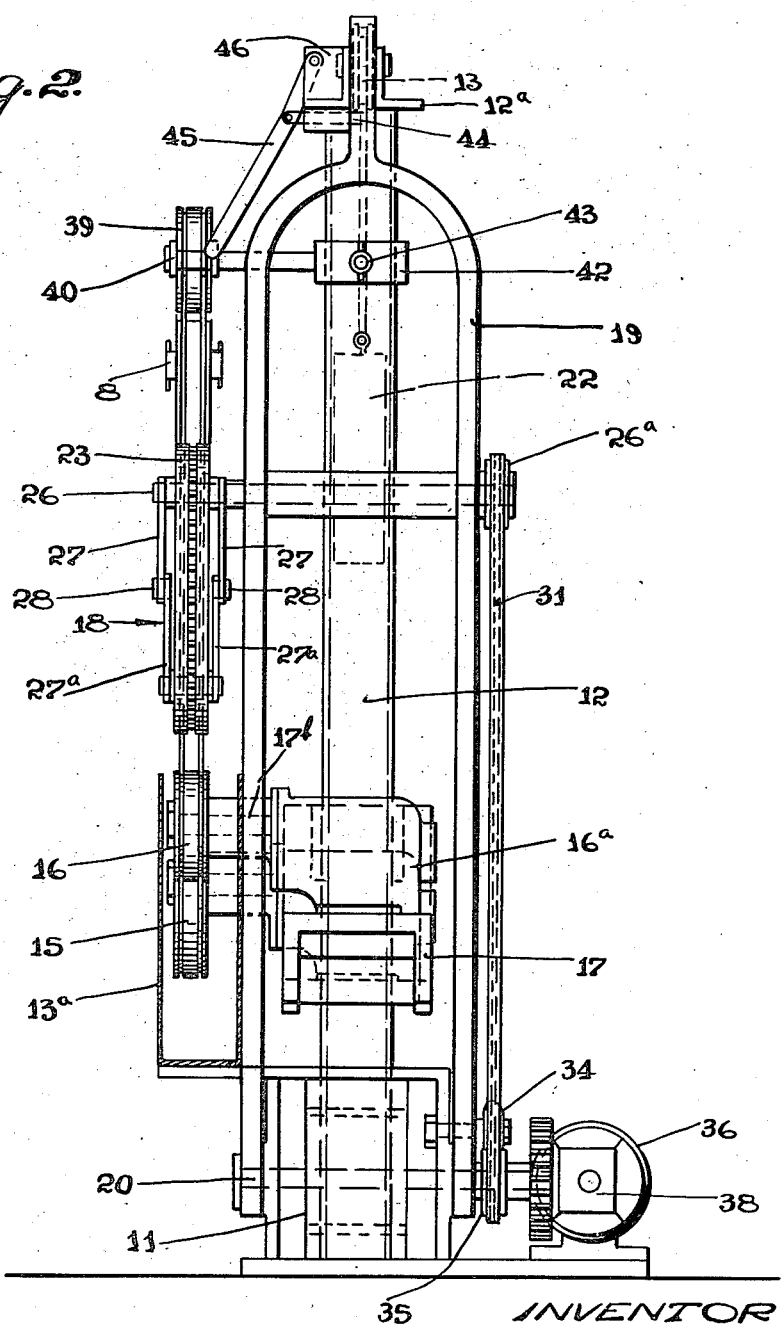
Figures 3, 5:
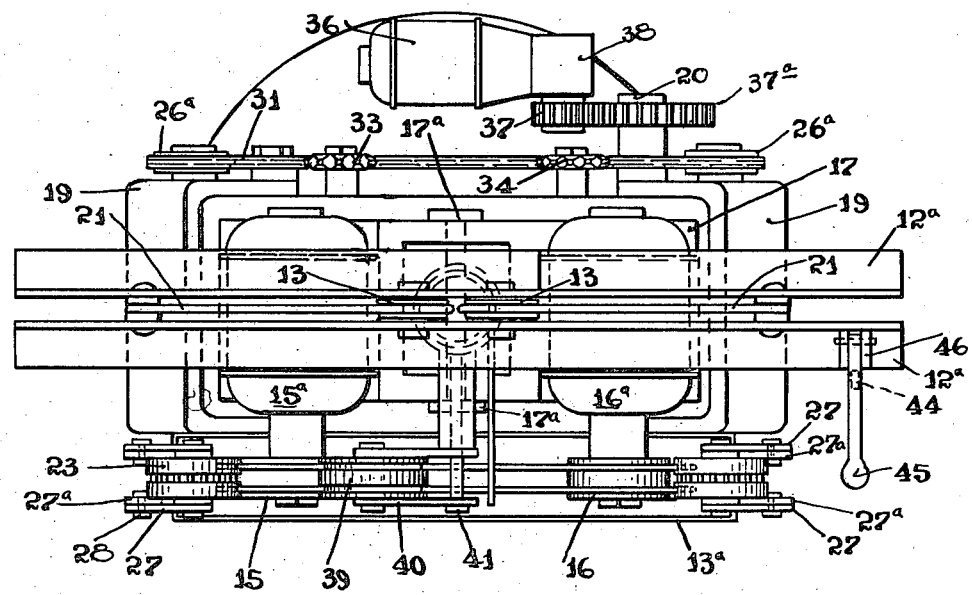

The invention has for its principal objects the provision of a machine which is of simple, cheap construction and large capacity and which permits a rapid and convenient placing and removal of the glass sheets. Certain embodiments of the invention are illustrated in the accompanying drawings, wherein:

Figure 1 is a front elevation partly in section of the machine. Fig. 2 is a side elevation. Fig. 3 is a plan view. Figs. 4 and 5 are enlarged sections on the lines IV—IV and V—V of Fig. 1. Fig. 6 is a diagrammatic view. And Fig. 7 is a fragmentary side elevation showing a modification.

As in my application heretofore referred to, the machine is illustrated as applied to edge grinding pairs of laminated glass sheets, which, in the present instance, are automobile side lights. Four sheets are arranged in assembled relation and consist of the pairs of side lights 1, 1 and 2, 2. Clamping bars 3, 3 are employed similar to those of my application and held in assembled relation as shown in detail in Fig. 5. The clamping bars are each in two parts with pairs of grooves therebetween having rubber linings 4. Extending through the pairs of members are the pipes 5, 5, welded to the inner bar members and threaded at their outer ends and provided with the nuts 6, 6. A pin 7 serves to align the two pipes 5, 5. Extending through the bars 3, 3 adjacent their ends are a pair of pipes 8, 8 similar to the pipes 5, 5, provided with indexing pins like the pins 7 and also provided with nuts 9, 9, which serve to clamp the bars together.

The frame of the machine consists of a base casting 10 provided with a socket 11, in which is mounted the hollow post 12. Welded to the top of the post is a transverse beam made up of a pair of spaced angle irons 12a, 12a and carrying adjacent the center thereof a pair of pulleys 13, 13 around which the cables for the counterweights pass as later described. Also mounted on the base is a sheet metal pan 13a which partially surrounds the grinding wheels and serves to collect the water which is supplied to the grinding wheels from the supply pipes 14, 14.

The grinding is accomplished by a pair of grooved grinding wheels 15 and 16, one of which is substantially smaller than the other and which are driven in opposite directions, as shown by the arrows. The grinding wheels are mounted on a frame 17 which is free to oscillate on the pin 17a carried by the post 12. The grinding wheels are carried upon the shafts 17b, 17b of the motors 15a and 16a which are bolted to the base of the oscillating frame 17. This method of mounting the wheels permits the wheels to accomodate themselves to sheets of varying shapes and sizes and insures the application of substantially the same grinding pressure by each wheel. The pairs of glass sheets 1, 1 and 2, 2 are rotated during the grinding operation by means of the pairs of caterpillars 18, 18 mounted upon the upright arms 19, 19. These arms are of U-shape, as indicated in Fig. 2, and are pivoted at their lower ends to the base of the frame upon the shafts 20, 20. The upper ends of the arms 19 lie in the slot between the angles 12a, 12a so that such slot acts as a guide for the ends of the arms. The upper ends of the arms have attached thereto the cables 21, 21 which pass over the pulleys 13, 13 and into the hollow post 12 where they are attached to a suitable counterweight 22. By this means yielding pressure is applied between the caterpillars and the edges of the glass sheets to insure proper driving contact.

The caterpillars consist of a pair of chains or belts 23, 23 passing around the sprockets 24, 24 and 25, 25. The sprockets 24 are supported upon shafts 26 extending through holes in the arms. A series of these holes are provided so that the caterpillars may be adjusted vertically with respect to the work in order to meet varying conditions. The lower sprockets 25, 25 are each supported by a pair of links 27, 27a pivoted together at 28, the link 27 having its upper end pivoted to the axle 26 of the sprocket 24, while the other link 27a has its lower end pivoted to the axle of the sprocket 25. A driving caterpillar is thus provided which is tensioned by the weight of the lower sprocket 25 and which permits the inner flight of the caterpillar which engages the glass to accommodate itself to contours of varying shape and position. The side links of the chains are provided with brackets 29, 29 as indicated in Fig. 4, and in these brackets are mounted continuous strips 30 of rubber which are grooved to receive the edges of the pairs of glass sheets. This insures a good driving contact between the caterpillars and the edges of the sheets. The caterpillar chains are driven by an endless chain 31 which passes around sprockets 26a carried by the shafts 26 of the sprockets 24, 24. This chain also passes around the idler sprockets 32, 33, and 34, and the sprocket 35, which is driven. This sprocket 35 is driven from a motor 36 carried by the base of the machine and driving a spur gear 37 through the intermediary of reduction gearing in the casing 38. The gear 37 meshes with a spur gear 37a carried by the axle of the sprocket 35. In this manner both caterpillars are driven at the same speed and by the one chain from the motor 36.

In order to assist in pressing the glass sheets downward against the grinding wheels 15 and 16, a hold-down roller 39 is employed, such hold-down member being carried by a bracket 40 pivoted at 41 to a collar 42 mounted upon the post 12. The collar is clamped to the post by means of the screw member 43 so that the hold-down member may be positioned at various points depending upon the character of the work. In some cases the use of this hold-down device is not required, but in other cases, it is of assistance.

In placing the work in position for grinding, the arms 19, 19 are swung outward away from each other and the glass plates in their clamping frames are moved down to the position shown, after which the arms are moved to the position shown, and the motors driving the grinding wheels and caterpillars are started. After the operation is completed, the arms 19, 19 are separated to remove the work and a new set of plates are positioned. In order to maintain the arms 19, 19 in separated position during the loading operation, a latch pin 44 is employed (Figs. 2 and 3), which is attached to the handle 45 carried upon the bracket 46, such bracket being attached to the outer end of one of the angle members 12a. When the right hand arm 19 is swung to the right, the pin 44 is withdrawn from the socket, and after the upper end of the arm has passed the pin, it is again positioned, as indicated in Fig. 2, which prevents the return of the arm to its inner position. The movement of the arm 19 to the right draws up the counterweight, so that the left hand arm 19 swings by gravity to its outer position to the left.

Fig. 6 illustrates the feature of utility involved in making the grinding wheels 15 and 16 of different diameters. The wheel 16 is of substantially less diameter than the wheel 15, and in those cases in which curves of small radius, such as the curve 46a, are to be ground, the smaller wheel works at this point on the periphery of the glass to better advantage than the larger wheel. The machine is thus adaptable to a greater variety of work than would otherwise be the case, and the capacity of the machine is materially increased as compared with the grinding machines using only a single grinding wheel. As the wheels work against each other due to their opposite direction of travel, the glass plates are in substantial equilibrium in so far as the action of the grinding wheels is concerned, so that there is nothing to offset the rotating action of the caterpillars, and the glass plates are held more steadily than would otherwise be the case.

Fig. 7 illustrates a modification which involves the use of a substitute driving means on the arms 19, 19 in place of the caterpillars of the Fig. 1 construction. The driving means, which is substituted for the caterpillars, consists of a pair of wheels 47, 48, whose peripheries are of soft rubber suitably grooved. The upper wheel 47 is mounted on a shaft 48a corresponding to the shaft 26 of the Fig. 1 construction, such shaft being driven by the chain 31 as in the other type of construction. The lower drive wheel 48 is hung on two pair of links 27 and 27a as heretofore described, and is driven by the train of spur gears 49, 50 and 51, as shown, the upper gear 49 being keyed to the shaft 48a. It will be seen that this drive means for rotating the glass sheets 1 and 2, functions in the same manner as the caterpillars, the driving engagement with the glass being less effective, however, than is the case with the caterpillars.

What I claim is:

1. A glass plate edging machine comprising an upright frame, a rocker frame mounted for oscillation on a horizontal axis on the frame, a pair of grooved grinding wheels rotating in a vertical plane on opposite sides of said axis, driving means for the wheels carried by the rocker frame, a pair of upright arms pivoted to the base of the upright frame on opposite sides of said axis, means carried by the frame exerting yielding force tending to draw said arms toward each other, continuous grooved sheet rotating means carried by each arm intermediate its ends for engaging the edges of a glass sheet to be ground when such sheet rests in the grooves of the grinding wheels, and means for driving the continuous grooved means to rotate the glass sheets.

2. A glass plate edging machine comprising an upright frame, a rocker frame mounted for oscillation on a horizontal axis on the frame, a pair of grooved grinding wheels rotating in a vertical plane on opposite sides of said axis, driving means for the wheels carried by the rocker frame, a pair of upright arms pivoted to the base of the upright frame on opposite sides of said axis, means carried by the frame exerting yielding force tending to draw said arms toward each other, an endless belt carried by each arm intermediate its ends provided with pairs of flanges and arranged so that its inner flight engages the edge of the glass sheet to be ground between the flanges when such sheet rests in the grooves of the grinding wheels, and means for driving said belts to rotate the sheet.

3. A glass plate edging machine comprising an upright frame, a rocker frame mounted for oscillation on a horizontal axis on the frame, a pair of grooved grinding wheels rotating in a vertical plane on opposite sides of said axis, driving means for the wheels carried by the rocker frame, a pair of upright arms pivoted to the base of the upright frame on opposite sides of said axis, means carried by the frame exerting yielding force tending to draw said arms toward each other, continuous grooved sheet rotating means carried by each arm intermediate its ends for engaging the edges of a glass sheet to be ground when such sheet rests in the grooves of the grinding wheels, rotatable hold-down means carried by the upright frame for engaging the upper edge of said sheet, and means for driving the continuous grooved means to rotate the sheet.

4. A glass plate edging machine comprising an upright frame, a rocker frame mounted for oscillation on a horizontal axis on the frame, a pair of grooved grinding wheels rotating in a vertical plane on opposite sides of said axis by the rocker frame, driving means for the wheels carried by the rocker frame, a pair of upright arms pivoted to the base of the upright frame on opposite sides of said axis, means carried by the frame exerting yielding force tending to draw said arms toward each other, a sprocket carried by each arm intermediate its end, a second sprocket suspended from the axis of the first sprocket by a pair of links, the lower of which is pivoted to the axis of the second sprocket, an endless belt extending around each pair of sprockets provided with pairs of flanges, and arranged so that the inner flights thereof engage the edges of the glass sheet to be ground between the flanges when the sheet rests in the grooves of the grinding wheels, and means for driving said belts to rotate the sheet.

5. A glass plate edging machine comprising an upright frame, a rocker frame mounted for oscillation on a horizontal axis on the frame, a pair of grooved grinding wheels rotating in a vertical plane on opposite sides of said axis, driving means for the wheels carried by the rocker frame, a pair of upright arms pivoted to the base of the upright frame on opposite sides of said axis, means carried by the frame exerting yielding force tending to draw said arms toward each other, continuous grooved sheet rotating means carried by each arm intermediate its ends for engaging the edges of a glass sheet to be ground when such sheet rests in the grooves of the grinding wheels, a motor carried by the base of the upright frame, and an endless belt driven by the motor and in driving engagement with said continuous grooved means.

6. A glass plate edging machine comprising an upright frame, a rocker frame mounted for oscillation on a horizontal axis on the frame, a pair of grooved grinding wheels rotating in a vertical plane on opposite sides of said axis, driving means for the wheels carried by the rocker frame arranged to drive the wheels in opposite directions with the upper portions of their peripheries moving toward each other, a pair of upright arms pivoted to the base of the upright frame on opposite sides of said axis, means carried by the frame exerting yielding force tending to draw said arms toward each other, continuous grooved sheet rotating means carried by each arm intermediate its ends for engaging the edges of a glass sheet to be ground when such sheet rests in the grooves of the grinding wheels, and means for driving the continuous grooved means to rotate the glass sheet.

7. A glass plate edging machine comprising an upright frame, a rocker frame mounted for oscillation on a horizontal axis on the frame, a pair of grooved grinding wheels rotating in a vertical plane on opposite sides of said axis, driving means for the wheels carried by the rocker frame, a pair of upright arms pivoted to the base of the upright frame on opposite sides of said axis, means carried by the frame exerting yielding force tending to draw said arms toward each other, continuous grooved sheet rotating means carried by each arm intermediate its ends for engaging the edges of a glass sheet to be ground when such sheet rests in the grooves of the grinding wheels, and means for driving the continuous grooved means to rotate the glass sheet, one of said grinding wheels being of substantially less diameter than the other.

WILLIAM OWEN.